Patented Oct. 31, 1944

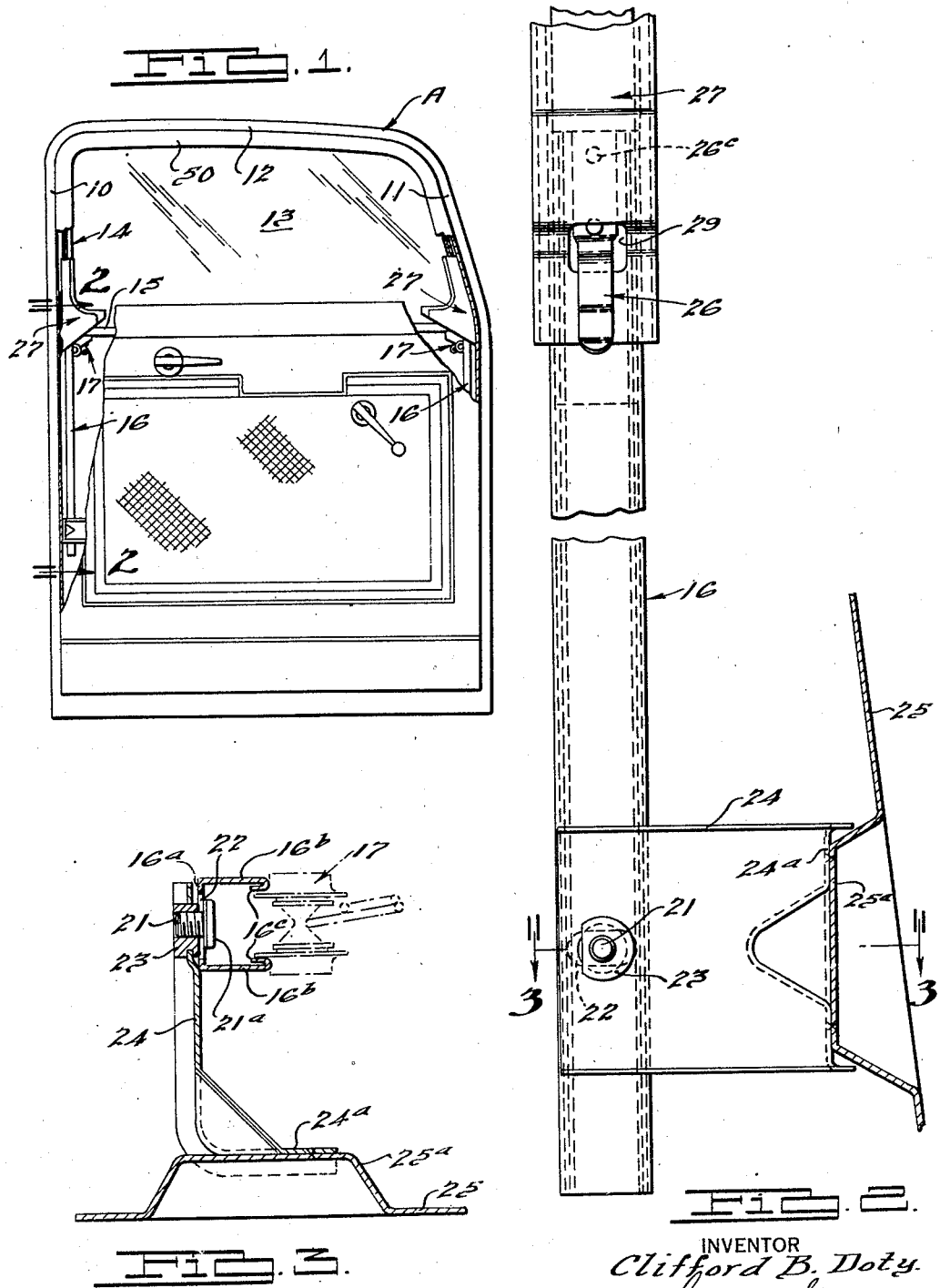

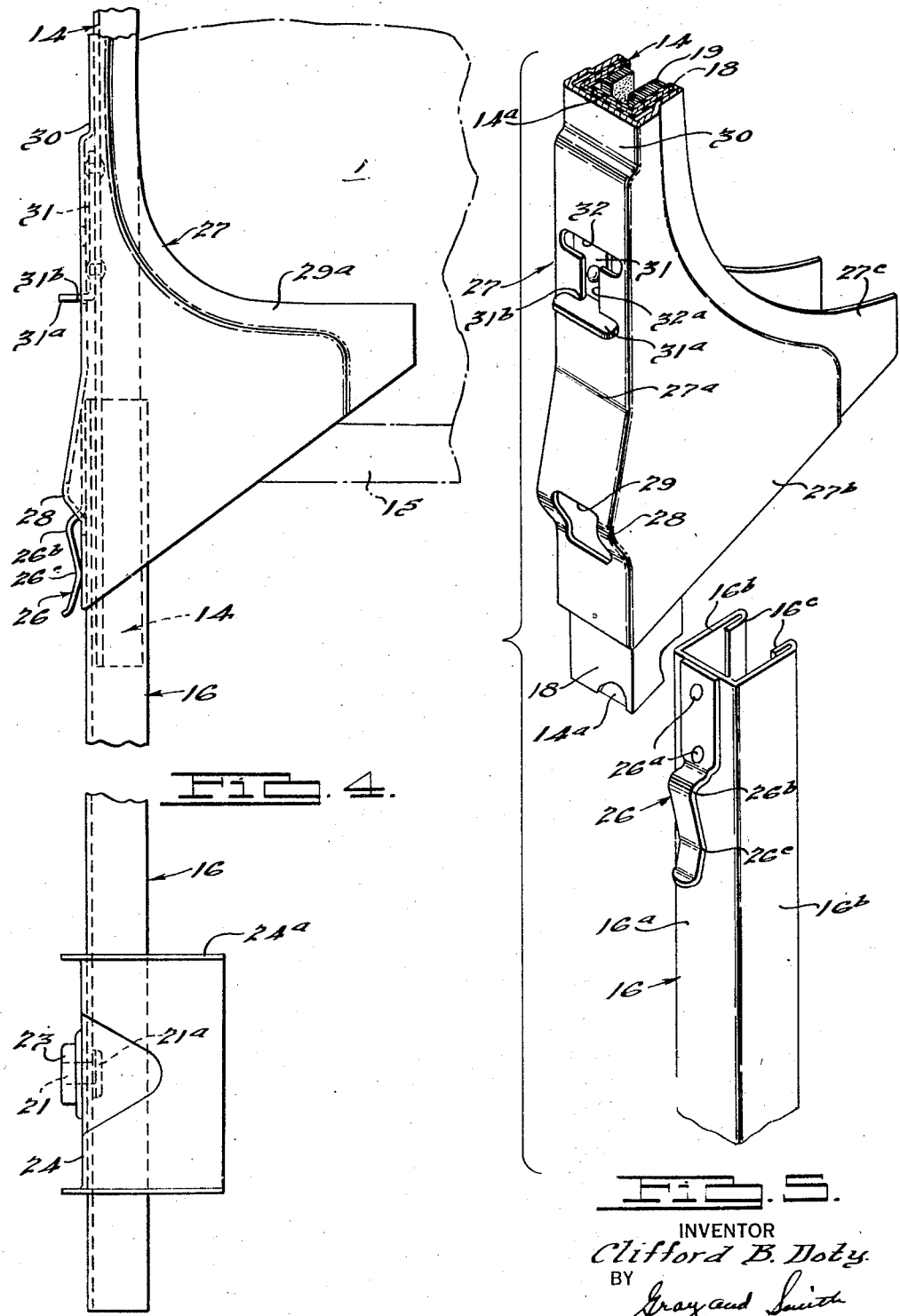

2,361,608

UNITED STATES PATENT OFFICE 2,361,608

VEHICLE BODY

Clifford B. Doty, Detroit, Mich., assignor to Briggs Manufacturing Company, Detroit, Mich., a corporation of Michigan Application August 15, 1941, Serial No. 406,954

14 Claims. (Cl. 296—44)

This invention relates to guiding and controlling means for glass or transparent panels of windows, particularly windows of automobiles, in which the said panels are adapted to be raised and lowered. The invention is especially useful as applied to the window structure for a vehicle body having a window frame of which the upper portion is in the form of a closed figure defining a window opening with a window well therebelow formed between inner and outer body or door panels within which a portion of the guiding mechanism of the present invention is installed and concealed from view.

In accordance with conventional automobile body construction, the door or other side wall portion of the body is provided with a window opening adapted to be closed or partially so by means of a glass panel which may be lowered into a well below the window opening. In automobile body construction where side channels for glass panels used within the window opening are separate from the glass retaining channels within the window well it is desirable to fix the lower channel member or members within the window well in alignment with the upper side channel member or members. Owing to allowable tolerances in production and manufacturing variances or inaccuracies, it has been difficult to secure uniformly desired accuracy of alignment between the upper and lower channel members, particularly since it has usually been the practice to install these parts at different sub-assemblies. As a result, it often occurs that the glass run members within the upper side channels are not in alignment with the lower channel guides within the well which results in unnecessary friction and cramping of the glass during its travel, thereby making it more difficult to control the vertically slidable panel in its upward and downward movements.

An object of the invention is to provide improved means for guiding a window panel into and out of the window well, which means includes adjustable upright guide members within the window well at all times in substantial alignment with the glass run channels within the window opening, the construction being such that the adjustable guide members may be moved in a direction transverse to the plane of the window panel.

A further object of the invention is to provide an upper glass run channel and a lower channel guide within the well into which the lower end of the glass run channel is telescoped, and a common support for the channels at their telescopic juncture which in turn permits lateral adjustment of the channel guide with respect to the glass run channel.

Another object of the invention is to provide an upper glass run channel within the window opening of a vehicle body and a lower channel guide within the well, the adjacent ends of the channels being adapted to be telescoped together and one adjustable alterally with respect to the other.

A further object is to provide a window panel guide structure of the foregoing character in which a channel support or bracket is provided on the body at the juncture of the two guide channels and into which both are telescoped, one or both adjacent ends of the guide channels being connected to the bracket for lateral adjustment.

A further object of the invention is to provide a guiding means for a window panel slidable up and down in a window structure of the type having a window frame with a window opening and a window well therebelow formed between inner and outer door panels, said guiding means comprising upper and lower upright guide members lying in substantially vertical alignment, a bracket fixed partially within said window well and lying adjacent said window opening, said upper guide member extending at its lower end within and fixed within said bracket, said lower guide member adapted for telescopic engagement with said upper guide member and being further adapted to extend within said corner brace to effect an adjustable connection therewith.

Another object of the invention is to provide improved means for guiding and controlling the sliding panel during its upward and downward movement so that the panel will travel more easily with less frictional resistance while at the same time it will be held firmly in substantially all positions, thereby minimizing vibrational movements thereof during the travel of the vehicle.

Another object of the invention is to provide improved means for guiding the window glass into and out of the window opening and window well, which means is relatively simple in construction, easy to install and highly efficient in use.

Other objects of this invention will appear in the following description and appended claims, reference being had to the accompanying drawings forming a part of this specification wherein like reference characters designate corresponding parts in the several views.

In said drawings:

Fig. 1 is an inner fragmentary side elevation, partly broken away and partly in section, of an automobile door embodying the invention.

Fig. 2 is an enlarged section taken substantially through lines 2—2 of Fig. 1 looking in the direction of the arrows.

Fig. 3 is an enlarged horizontal sectional view taken substantially through lines 3—3 of Fig. 2 looking in the direction of the arrows.

Fig. 4 is an enlarged fragmentary elevational view of the guide structure shown in Fig. 1.

Fig. 5 is an exploded view in perspective showing the portions of the channel guides at their intended juncture.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain embodiments of the invention applied, by the way of example, to an automobile door. It will be understood, however, that the embodiment herein exemplified in part or in whole may be used in other relations and in other window structures, and in particular that the guiding means may be used generally in vehicle bodies or the like in connection with window panels which are adapted to be raised and lowered.

The invention is herein illustrated as applied to an automobile door. It will be obvious that the present invention may be used in connection with various windows of the automobile. In the present instance the guiding means of the present invention is applied to both upright edges of the glass.

In Fig. 1 there is illustrated an automobile door A including upright side pillars 10 and 11 joined by a header 12, thus providing a window frame in the form of a closed figure defining a main window opening adapted to be closed by means of a vertically slidable glass or other transparent panel 13. The window framing or side pillars are formed with grooves or recesses to receive glass runway guide channels 14, terminating at or adjacent the bottom of the window opening, and designed to receive the edges of the glass panel 13.

Secured to the lower edge of the glass panel 13 is a channel bar or glass retainer member 15 to which a window regulator of any suitable type is adapted to be connected. The window panel 13 is guided within the window well through the medium of spaced upright guide channels 16, of which but one is shown. The glass retainer member 15 carries guide devices at opposite ends thereof, herein shown as spring pressed roller devices generally indicated by the numeral 17, which travel along the edges of the channel guides 16.

The glass run channel or guide 14 of which but one is shown in Figs. 1 and 5 may be of any suitable type having considerable rigidity or stiffness yet designed to be bent around the upper edge of the window into substantially U-shape. Preferably the glass run is in the form of a thin metal channel preferably completely encased in rubber 18 bonded to the inner and outer surfaces thereof. The inner surfaces of the flanges of the channel carry a fibrous pile fabric or felt 19 adapted to engage and cushion the side edges of the glass panel 13.

The guide 14 is positioned so that its upper portion extends vertically into a fixed corner brace or bracket 27. The corner brace 27 is generally U-shaped or channel shaped in form and is vertically positioned adjacent the window opening extending partially within the window well. The bracket or brace 27 may be fixed within the window frame and well to the door pillar by any suitable means, such as by spot welding. As shown more particularly in Figs. 4 and 5, the support or bracket 27 is in the form of a channel through which the vertically slidable glass is adapted to travel in its upward and downward movement. It comprises a base 30 having an offset portion 27a and inwardly extending generally angularly shaped parallel flanges 27b having a curvilinear depressed portion 27c lying adjacent the window opening. The base 27a has an embossed or outwardly bulged portion 28 which is provided with a rectangular slot 29. The base is further provided at its upper end with a depressed portion 30, the inner face of which engages the outer face 14a of the guide 14 when the guide 14 is clamped into position.

As illustrated in Figs. 3 and 5 the lower upright guide member 16 lies entirely within the window well and is in the form of a channel having a base portion 16a and inwardly extending parallel flanges 16b, terminating in inturned edges 16c which form tracking members for the roller guide devices 17. The base portion 16a of the guide 16 is of a width substantially greater than that of the base 14a of the guide 14 to permit the lower end portion of guide member 14 to be inserted therein, and is also of a width substantially smaller than the base portion 27a of the bracket 27 to permit the upper end of the guide 16 to be inserted within the bracket. The guide 16 telescopes over the lower end of guide 14 which preferably has a snug fit therein.

The guide member 16 is adjustably secured for transverse or lateral movement both at its upper and lower portions within the window well. At its lower portion the guide 16 is secured within the window well through the medium of a slotted connection which comprises an adjustable threaded cap screw 21 having a flat partly circular head portion 21a which engages a horizontally extending slotted portion 22 of the guide member 16. The screw 21 extends through the slotted portion 22 of the guide 16 and engages a threaded clinch nut 23 secured in an aperture in the outer end of a bracket plate 24, which plate has a flange 24a secured by spot welding to an embossed portion 25a of the inner door panel 25 of the vehicle door. Thus, the guide member 16 at its lower end may be adjusted transversely to the plane of the slidable panel 13 to insure alignment with the upper guide member 14. While there has been described one satisfactory way by which the guide 16 may be adjustably connected at its lower portion within the window well it is understood that any suitable adjustable connection may be substituted which will permit a satisfactory transverse adjustment of the guide member.

At its upper end the upright guide member 16 is provided upon the outer surface of its base portion 16a, substantially in the central part thereof, with a downwardly extending resilient clip or tongue member 26. The tongue 26 is secured to the guide 16 by rivets 26a and comprises an outwardly extending bowed portion 26b and a lip portion 26c which has a normal tendency to press inwardly towards the base 16a of the guide 16. When the guide member 16 is placed into position preliminary to adjustment, the clip or tongue 26 extends through the slot 29, its lip portion 26c yieldingly engaging the outer face 27a of the brace 27.

Referring to Figs. 2 and 4, the present device is illustrated in its assembled form, which assembly consists of the following steps. The guide 16 is preferably first installed with its upper end telescoped into the bracket 27 before installation of the glass run channel 14. The upper end of the guide member 16 is extended within the corner brace 27 so that the clip 26 registers with slot 29 formed within the embossed portion 28 of the base of the bracket 27. The guide 16 is then drawn downwardly to permit lip 26c of the clip 26 to hook over the lower edge of the slot and firmly engage the outer face of the base 27a of the bracket 27 effecting an adjustable connection therewith. The glass run channel 14 is then installed in the window opening and the lower end thereof inserted down through the upper end of bracket 27. As shown in Fig. 5 the channel 14 projects a distance below the bracket and telescopes within guide 16. The correct aligned position of the upper end of guide 16 with relation to guide 14 may be fixed by shifting it laterally within bracket 27, the width of slot 29 permitting clip 26 to be shifted laterally therein. A corresponding adjustment of the lower end of guide 16 may at the same time be accomplished by loosening screw 21, the slot 22 permitting this adjustment. Thereupon the screw 21 is tightened to fix the position of the lower end of guide 16. The guide 14 may then be fixed or clamped into position within the window frame. This is usually accomplished in the installation of the garnish molding 50 around the margin of the window opening, the molding abutting against one side face of the glass run channel 14 and clamping the channel tightly against a face of the door pillar. When guide 14 is thus secured in place the lower portion thereof is fixed within the upper end of the guide 16 and in correct vertical alignment therewith. Adjustment of the lower end of guide 16 may be accomplished after installation of the garnish molding, or screw 21 may be tightened as a final operation after the guides have been finally lined up and the garnish molding installed.

The glass run 14 may be anchored to the bracket 27 against withdrawal from channel guide 16 by an interlocking connection shown in Figs. 4 and 5. A metal strip 31 is riveted to the base of the insert channel of glass run 14 and has an outwardly projecting key or lug 31a. The base of bracket 27 has a keyhole slot 32 into the wider portion of which the head of key 31a may pass after which the narrow neck 31b of the key or lug can be shifted downwardly into the narrow portion 32a of the slot locking the parts together.

By thus insuring accuracy in alignment between upper and lower window guide members, I have provided an improved window guide for the guiding of a slidable panel in and out of a window well wherein friction and cramping of the panel in its upward and downward movements have been reduced to a minimum.

I claim:

1. In a window structure, a window frame forming a window opening with a well therebelow, a window panel shiftable up and down in said frame, an upper flexible guiding channel separate from and engaging the frame within said opening, a lower upright guide channel within said well, a member secured to said frame and to which the upper end of said lower channel has a lateral sliding connection in a direction transverse to the plane of the window panel to effect alignment of said channels, said channels being telescoped together.

2. In a window structure, a window frame forming a window opening with a well therebelow, a window panel shiftable up and down in said frame, an upper flexible guiding channel separate from and engaging the frame within said opening, a lower upright guide channel within said well, a channel shaped bracket secured to the frame and receiving therein the lower end of the flexible channel and the upper end of the lower channel, one of said channels being adjustable on the bracket in a direction transverse to the plane of the window panel to align the channels and permit them to be telescoped together.

3. In a window structure, a window frame forming a window opening with a well therebelow, a window panel shiftable up and down in said frame, an upper guide channel for the panel separate from said frame and mounted within a groove therein at the side of said opening, a lower guide channel within the well, a bracket receiving therein adjacent ends of said channels and with which the upper end of the lower channel has a sliding connection to permit the same to be shifted transversely to the plane of the window panel relatively to the upper guide channel to align it with the upper channel.

4. In a window structure, a window frame forming a window opening with a well therebelow, a window panel shiftable up and down in said frame, an upper guide channel for the panel separate from said frame and bent to extend around the edge of said opening within a groove in said frame, a lower guide channel within the well, a bracket receiving adjacent ends of said channels and with which the upper end of the lower channel has a spring hook and slot connection permitting sliding movement of said upper end to align it with the upper channel.

5. In a window structure, a window frame forming a window opening with a well therebelow, a window panel shiftable up and down in said frame, an upper guide channel for the panel separate from said frame and mounted within a groove therein at the side of said opening, a lower guide channel within the well, a fixed channel shaped bracket receiving adjacent ends of said channels and with which the upper end of the lower channel has a spring hook and slot connection permitting sliding movement of said upper end to align it with the upper channel.

6. In a window structure having a frame providing a window opening and a well therebelow, window panel guiding means comprising an upper flexible guide member separate from and engaging the frame in the window opening and a rigid lower guide member within the well, a fixed bracket adjacent the lower edge of the window opening receiving the lower end of the upper guide member and the upper end of the lower guide member, said upper end having a sliding connection with the bracket in a direction transverse to the plane of the window panel to permit alignment of said guide members, said guide members comprising channels and the ends of the channels being telescoped together.

7. In a window structure having a frame providing a window opening and a well therebelow, window panel guiding means comprising an upper flexible guide member separate from and engaging the frame in the window opening and a rigid lower guide member within the well, a fixed bracket adjacent the lower edge of the window opening receiving the lower end of the upper guide member and the upper end of the lower guide member, said upper end having a sliding connection with the bracket to permit said upper end to be shifted relative to the bracket transversely to the plane of the window panel into position to permit alignment of said guide members, the lower end of the upper guide member extending below the bracket and into overlapping engagement with the lower guide member.

8. In a window structure having a frame providing a window opening and a well therebelow, window panel guiding means comprising an upper flexible guide member separate from and engaging the frame in the window opening and a rigid lower guide member within the well, a fixed bracket secured to the frame adjacent the lower edge of the window opening and having a channel receiving the lower end of the upper guide member and the upper end of the lower guide member, said channel being of greater width than the lower guide member in a direction transversely to the plane of the window panel and said upper end having a transverse sliding connection with the bracket to permit alignment of said guide members.

9. In a window structure having a window opening, a well therebelow and a window panel slidable up and down therein, an upper glass run channel within the window opening, a lower guide channel within the well, a channel bracket receiving adjacent ends of the channels, and a sliding spring hook and slot connection permitting transverse movement between the upper end of the guide channel and the bracket to permit the channels to be aligned, the aligned ends of the channels being telescoped together.

10. In a window structure having a fixed window frame forming a window opening, a well therebelow and a window panel slidable up and down therein, an upper glass run channel member separate from said window frame and mounted within the window opening, a lower guide within the well, a bracket having a channel into which the adjacent ends of the channel member and guide are insertable, said channel having a width sufficient to permit shiftable movement of the guide therein transversely to the plane of the window panel, and a sliding connection between the upper end of the guide and the bracket to permit the guide to be shifted in said transverse direction into alignment with the channel member to form a continuous guide for the panel.

11. In a window structure having a fixed window frame forming a window opening, a well therebelow and a window panel slidable up and down therein, an upper glass run channel member separate from said window frame and mounted within the window opening, a lower guide within the well, a bracket having a channel into which the adjacent ends of the channel member and guide are insertable, said channel having a width sufficient to permit shiftable movement of the guide therein transversely to the plane of the window panel, and a sliding connection between the upper end of the guide and the bracket to permit the guide to be shifted in said transverse direction into alignment with the channel member to form a continuous guide for the panel, the lower end of said channel member having a releasable interlocking connection with said bracket.

12. In a window structure, a window frame forming a window opening with a well therebelow, a window panel shiftable up and down in said frame, an upper flexible guiding channel separate from and engaging the frame within said opening, a lower upright guide channel within said well, a member secured to said frame and to which the upper end of said lower channel has a lateral sliding connection in a direction transverse to the plane of the window panel to effect alignment of said channels, said channels being telescoped together, and each of said channels having an interlocking sliding connection with said member.

13. In a window structure, a window frame forming a window opening with a well therebelow, a window panel shiftable up and down in said frame, an upper guide channel for the panel separate from said frame and mounted within a groove therein at the side of said opening, a lower guide channel within the well, a bracket receiving therein adjacent ends of said channels and with which the upper end of the lower channel has a sliding connection to permit the same to be shifted transversely to the plane of the window panel relatively to the upper guide channel to align it with the upper channel, the lower end of the upper guide channel having a connection with the bracket permitting sliding movement thereof in a generally vertical direction.

14. In a window structure having a frame providing a window opening and a well therebelow, window panel guiding means comprising an upper flexible guide member engaging the frame in the window opening and a rigid lower guide member within the well, a fixed bracket adjacent the lower edge of the window opening receiving the lower end of the upper guide member and the upper end of the lower guide member, said upper end having a sliding connection with the bracket in a direction transverse to the plane of the window panel to permit alignment of said guide members and said lower end having an interlocking sliding connection with the bracket in a generally vertical direction.

CLIFFORD B. DOTY.